US010207565B2

(12) United States Patent
Preis et al.

(10) Patent No.: US 10,207,565 B2
(45) Date of Patent: Feb. 19, 2019

(54) METHOD AND DEVICE FOR FASTENING A PLASTICS COMPONENT TO A LOAD-BEARING COMPONENT

(71) Applicant: MAN Truck & Bus AG, München (DE)

(72) Inventors: Roland Preis, Painten (DE); Thomas Heindl, München (DE)

(73) Assignee: MAN Truck & Bus AG, Munich (DE)

( * ) Notice: Subject to any disclaimer, the term of this patent is extended or adjusted under 35 U.S.C. 154(b) by 213 days.

(21) Appl. No.: 15/285,764

(22) Filed: Oct. 5, 2016

(65) Prior Publication Data
US 2017/0096046 A1    Apr. 6, 2017

(30) Foreign Application Priority Data

Oct. 5, 2015 (DE) .................. 10 2015 012 869

(51) Int. Cl.
| | | |
|---|---|---|
| F16B 5/02 | (2006.01) | |
| B60H 1/00 | (2006.01) | |
| F16F 15/08 | (2006.01) | |
| F16B 43/00 | (2006.01) | |

(52) U.S. Cl.
CPC ..... *B60H 1/00521* (2013.01); *B60H 1/00564* (2013.01); *F16B 5/0241* (2013.01); *F16B 43/00* (2013.01); *F16F 15/085* (2013.01)

(58) Field of Classification Search
CPC .......... F16B 5/0241; F16B 43/00; F16B 5/02; F16F 15/085
USPC .... 411/372.5, 367, 371.1, 371.2, 372.6, 373, 411/374
See application file for complete search history.

(56) References Cited

U.S. PATENT DOCUMENTS

| | | | | |
|---|---|---|---|---|
| 1,350,545 | A * | 8/1920 | Cook ...................... | F16B 39/26 411/260 |
| 2,225,654 | A * | 12/1940 | Olson ..................... | F16B 39/26 411/176 |

(Continued)

FOREIGN PATENT DOCUMENTS

| | | |
|---|---|---|
| DE | 19948868 A1 | 4/2001 |
| DE | 102008050143 A1 | 5/2009 |

(Continued)

OTHER PUBLICATIONS

European Search Report issued in corresponding application No. 16001904.8 dated Feb. 6, 2017.

*Primary Examiner* — Roberta S Delisle
(74) *Attorney, Agent, or Firm* — Weber Rosselli & Cannon LLP

(57) ABSTRACT

The present disclosure relates to a method and device for fastening a plastics component to a load-bearing component. The fastening device includes a plastics component which is fastened to the load-bearing component by a screw connection, and a rubber-metal buffer which is arranged as a resilient support between the load-bearing component and the plastics component. The fastening device further comprises at least one metal tip which is arranged between the rubber-metal buffer and the plastics component, and which protrudes from a metal disk in the direction of the plastics component and engages at least partially in a surface of the plastics component when the plastics component is screwed to the load-bearing component.

15 Claims, 6 Drawing Sheets

(56) References Cited

U.S. PATENT DOCUMENTS

| | | | | |
|---|---|---|---|---|
| 2,226,505 | A | * | 12/1940 | Saurer .................. F16L 55/035 |
| | | | | 403/228 |
| 2,905,411 | A | * | 9/1959 | Cunningham ........ F16F 15/085 |
| | | | | 248/603 |
| 5,295,414 | A | * | 3/1994 | Nakamura ............. B60K 17/00 |
| | | | | 248/638 |
| 5,482,260 | A | * | 1/1996 | Schmidt ................ F16F 1/3605 |
| | | | | 267/141 |
| 5,536,125 | A | * | 7/1996 | Gaw, Jr. ................ F16B 5/0241 |
| | | | | 411/112 |
| 5,908,187 | A | | 6/1999 | Kalkoske et al. |
| 8,636,438 | B2 | * | 1/2014 | Riekers .................. B60K 13/04 |
| | | | | 403/220 |
| 8,783,702 | B2 | * | 7/2014 | Lee .......................... B60G 7/02 |
| | | | | 280/124.134 |
| 9,956,868 | B1 | * | 5/2018 | Harrison .............. B60K 15/067 |
| 2003/0030201 | A1 | | 2/2003 | Williams |
| 2008/0142647 | A1 | | 6/2008 | Connelly et al. |

FOREIGN PATENT DOCUMENTS

| | | |
|---|---|---|
| EP | 2230410 A1 | 9/2010 |
| GB | 2164302 A | 3/1986 |
| WO | 2013/062465 A1 | 5/2013 |

* cited by examiner

METHOD AND DEVICE FOR FASTENING A PLASTICS COMPONENT TO A LOAD-BEARING COMPONENT

TECHNICAL FIELD

The present disclosure relates to a fastening device for fastening a plastics component to a load-bearing component. The disclosure further relates to a method for fastening a plastics component to a load-bearing component.

BACKGROUND

It is known in practice to fasten the primary air channel of trucks to a driver's cab rear wall. The primary air channel is also denoted hereinafter as the air suction duct or primary air duct. For decoupling the air suction duct from the driver's cab in terms of vibration technology, said air suction duct is fastened to the driver's cab rear wall by means of rubber-metal buffers.

This is shown by way of example in FIG. 1 which shows a view in the direction of travel of the rear wall 2 of the driver's cab of a truck. The air suction duct is denoted by the reference numeral 1 and is fastened to the driver's cab rear wall at the four screw connection points 3. FIG. 2 shows a sectional view of the screw connection point 3 along the line A-A of FIG. 1. The two rubber-metal buffers 4 serve as resilient supports between the driver's cab rear wall 2 and the air suction duct 1. In this case the rubber-metal buffers 4 are initially screwed by means of a socket wrench and a defined torque into the rivet nut 5 integrated in the driver's cab rear wall 2. Subsequently, the air suction duct 1 is suspended on the rubber-metal buffers 4, and aligned and tightened by the same tool or a separate tool by one respective nut 9 comprising a washer 8.

In this known fastening method of the primary air channel 1 to the driver's cab rear wall 2, it has been additionally established that the rubber-metal buffers 4 twist once during the screwing procedure by up to 180 degrees about their longitudinal axis. After positioning the socket wrench the twisting is relaxed to ca. 45 degrees. The consequences of such twisting are a negative impact on the damping properties of the rubber-metal buffer 4 and a restriction of the service life of the rubber-metal buffer 4. Thus, it is an object of the present disclosure to provide an improved fastening device, the drawbacks of conventional techniques being able to be avoided thereby.

SUMMARY

The object of the present disclosure, in particular, is to provide a fastening device for fastening a plastics component to a load-bearing component in which a rubber-metal buffer 4 is arranged as a resilient support between the load-bearing component and the plastics component, wherein during the screwing procedure the aforementioned twisting of the rubber-metal buffer may be reliably avoided. A further object of the present disclosure is to provide an improved method for fastening a plastics component to a load-bearing component, in which the plastics component is fastened by a screw connection to the load-bearing component and a rubber-metal buffer is arranged as a resilient support between the load-bearing component and the plastics component, the drawbacks of conventional methods being able to be avoided thereby.

These objects are achieved by devices and methods having the features of the independent claims. Advantageous embodiments and applications of the present disclosure are disclosed from the dependent claims and are described in more detail in the following description by partial reference to the figures.

According to a first aspect of the present disclosure, a fastening device is provided for fastening a plastics component to a load-bearing component. The fastening device comprises, in a manner known per se, a plastics component which is fastened to the load-bearing component by a screw connection, and a rubber-metal buffer which is preferably arranged as a resilient support between the load-bearing component and the plastics component.

So-called rubber-metal buffers are known from the prior art. In this case said rubber-metal buffers are resilient supports which are designed for absorbing vibrations along the longitudinal axis of the rubber-metal buffer. Rubber-metal buffers generally consists of two metal discs and a rubber part arranged between the two metal discs. The hardness of the rubber part may be optimized and suitably designed with regard to damping vibrations. The two metal discs are generally connected fixedly to the rubber part by vulcanization. A threaded hole may be provided in the centre of each disc. Alternatively, a threaded shaft which extends in the axial direction through the metal discs and the rubber part may be provided already. Such metal buffers are suitable, in particular, for mounting equipment which is lightweight and moderately heavy. In the aforementioned application of the present disclosure in which an air suction duct is fastened to the rear face of a driver's cab, the main object of the rubber-metal buffer is to prevent, or at least to reduce, the transmission of vibrations from the driver's cab to the anchoring of the air suction duct.

Within the scope of the present disclosure, it has been established that the twisting of the rubber-metal buffer during the screwing procedure described above is caused by a rotation of the metal bushing 6 pressed into the air suction duct 1. The metal bushing 6 rotates during the screwing procedure relative to the air suction duct 1 and thereby forces a moment onto the rubber-metal buffer 4 bearing thereagainst.

According to the first aspect, the object according to the present disclosure is achieved by the fastening device having at least one metal tip which is arranged between the rubber-metal buffer and the plastics component. The at least one metal tip protrudes from a metal disc in the direction of the plastics component and, in the state of the plastics component screwed to the load-bearing component, engages at least partially in a surface of the plastics component. The at least one metal tip forms a positive anti-rotation stop with the plastics component and/or is arranged so that during the screwing procedure it prevents a rotation of the rubber-metal buffer, in particular of the rubber part, relative to the load-bearing component. Preferably, a plurality of such metal tips are provided. All subsequent embodiments in which variants are described by using the term metal tips, also apply to the general case where only one metal tip is provided, even if this is not expressly disclosed.

The term metal tip is also intended to encompass pins or spikes which have a greater hardness than the plastics component and thus during the fastening process may be pressed into the plastics component, whereby during the fastening process a positive connection is formed with the plastics component. The metal tips are preferably designed as angular metal tips. The vertical length of the metal tips may be small, i.e. the metal tips may protrude by a small vertical length from the metal disc. The insertion into the plastic of the plastics component has no effect and/or only very little effect on the pretensioning force of the connection.

According to a further embodiment of the present disclosure, in comparison with a conventional fastening device an additional metal disc is provided, the metal tips protruding therefrom and said metal disk bearing against a metal disc of the rubber-metal buffer. The additional metal disc comprising the metal tips bears against the metal disc of the rubber-metal buffer which is arranged on the side of the rubber metal buffer facing the plastics component. This embodiment provides the advantage that only one additional inexpensive component has to be provided in the form of a metal disc with integrally formed tips, in order to provide an anti-rotation stop according to the present disclosure.

According to an alternative preferred embodiment, the metal tips protrude from one of the two metal discs of the rubber-metal buffer, and namely from the metal disc which in the screwed state faces the plastics component. According to this variant, an additional metal disc is not required but the rubber-metal buffer is correspondingly modified such that one of its metal discs has integrally formed tips. This provides the advantage that the production sequence remains unaltered since an additional component does not have to be integrated into the screw connection.

A further alternative embodiment provides that the metal disc from which the metal tips protrude is fastened by a material connection to the plastics component. For example, the metal disc may be already fastened thereto during the injection-moulding of the plastics component, by the metal disc being injection-moulded at least partially with plastics material during the injection-moulding of the plastics component.

A particularly advantageous variant of the aforementioned embodiments provides that the metal tips are arranged on an outer region of the metal disc, in particular on an outer edge of the metal disc. For example, the metal tips may be uniformly distributed on an outer edge of the metal disc. By this arrangement on the outer edge of the metal disc, the metal tips are located on a large pitch circle relative to the longitudinal axis of the rubber metal buffer. As a result, even with low forces, relatively high tightening torques may be achieved. A further advantage is that with such an arrangement of the metal tips the position of the rubber-metal buffer may be slightly varied relative to the hole and/or the bushing of the plastics component. This permits an alignment of the plastics duct as required.

According to a further exemplary embodiment, the metal disc from which the metal tips protrude may comprise at least one fixing lug and/or a tensioning element which protrude(s) on an outer edge of the metal disc in the direction of the rubber-metal buffer. In the state of the plastics component screwed to the load-bearing component, the fixing lug and/or the tensioning element may bear against a peripheral region of the rubber body of the rubber-metal buffer and additionally secure said rubber-metal buffer in this manner. The fixing lug and/or the tensioning element secures the metal disc against lateral slippage relative to the rubber part of the rubber-metal buffer.

Moreover, the metal disc from which the metal tips protrude may comprise a central opening, a threaded shaft of the screw connection being guided therethrough in the state of the plastics component screwed to the load-bearing component. Moreover, a metal bushing may be pressed into the plastics component, a threaded shaft of the screw connection being guided therethrough in the state of the plastics component screwed to the load-bearing component.

According to a particularly preferred exemplary embodiment, the plastics component is a primary air channel and/or an air suction duct for fresh air of a utility vehicle. Moreover, the load-bearing component may be a driver's cab rear wall of a utility vehicle, in particular of a truck. However, it is stressed that the present disclosure is not limited to this aforementioned exemplary application. Instead, the fastening device according to the present disclosure may be used with the additionally provided metal tips for forming an anti-rotation stop of any type of plastics components which are fastened to a load-bearing component by using a rubber-metal buffer.

The present disclosure further relates to a vehicle, in particular a utility vehicle, for example a truck, an agricultural and forestry machine, a construction machine or passenger motor vehicle, in particular a truck comprising a fastening device as disclosed in this document. According to a second aspect of the present disclosure, moreover, a method for fastening a plastics component to a load-bearing component is provided in which the plastics component is fastened by a screw connection to the load bearing component and a rubber-metal buffer is arranged as a resilient support between the load-bearing component and the plastics component. According to the method, metal tips which are arranged between the rubber-metal buffer and the plastics component and protrude from a metal disc in the direction of the plastics component and, in the state of the plastics component screwed to the load-bearing component, engage at least partially in a surface of the plastics component, are used in order to form a positive anti-rotation stop thereby.

To avoid repetition, features which have been disclosed purely according to the device are also intended to apply and to be able to be claimed as disclosed according to the method. The aforementioned aspects and features according to the present disclosure relating to the metal tips thus also apply to the method.

BRIEF DESCRIPTION OF THE DRAWINGS

The preferred embodiments and features of the present disclosure described above are able to be combined together in any manner. Further details and advantages of the present disclosure are described hereinafter with reference to the accompanying drawings, in which.

Elements which are the same or functionally equivalent are denoted in all of the figures by the same reference numerals.

DETAILED DESCRIPTION

Figure 1:
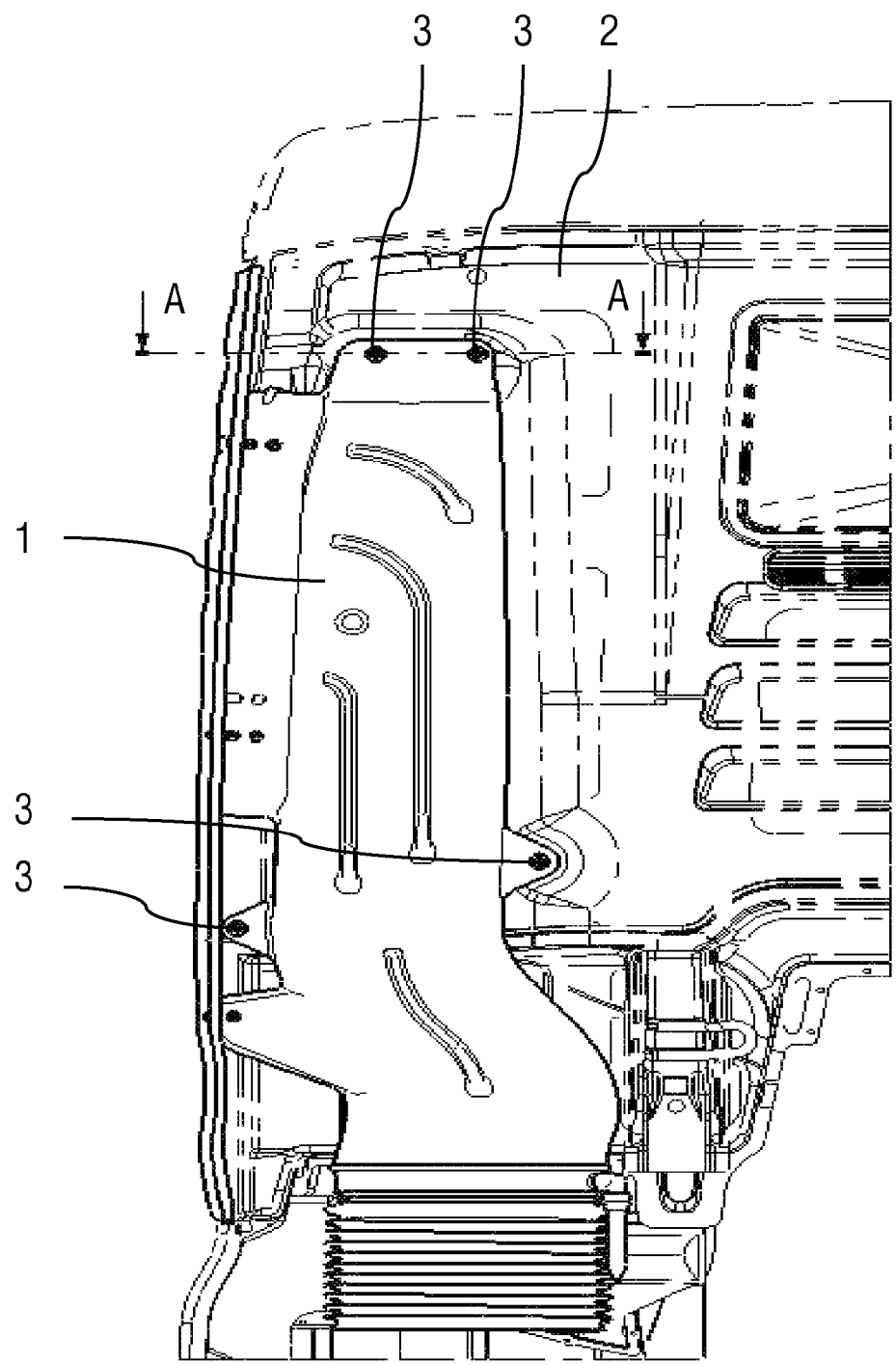
FIG. 1 shows a rear wall of a utility vehicle driver's cab with a primary air duct fastened thereto.
Figure 2:
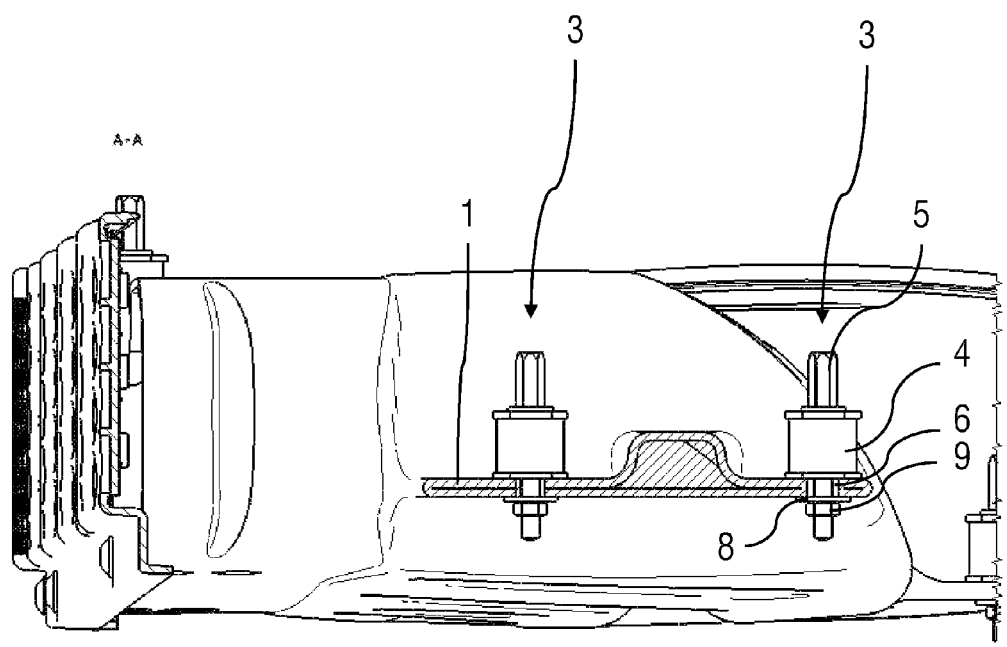
FIG. 2 shows a sectional view along the line A-A of FIG. 1.
Figure 3:
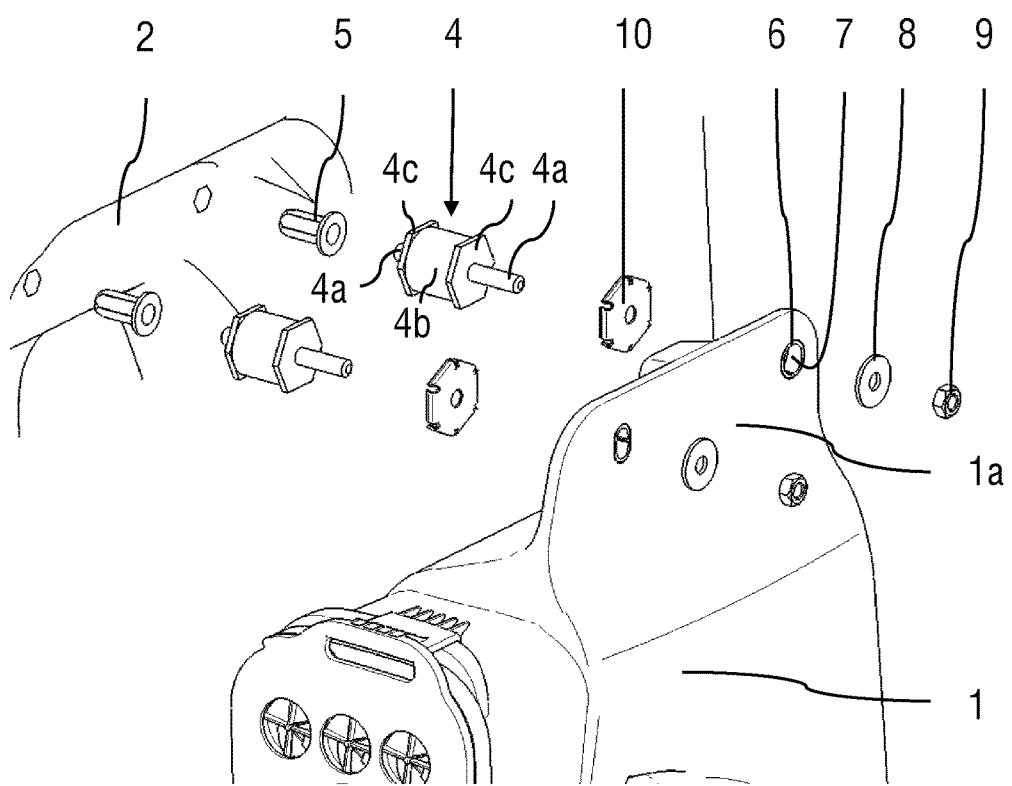
FIG. 3 shows a perspective exploded view of a fastening device according to an exemplary embodiment of the present disclosure.

FIG. 3 shows a perspective exploded view of a fastening device 15 according to an exemplary embodiment of the present disclosure. The fastening device 15 serves for fastening a plastics component 1, in this case a plastics air suction duct 1 to a load-bearing component 2. The load-bearing component in the example shown is a driver's cab rear wall of a utility vehicle. To this end, the air suction duct 1 comprises at its upper end a tapered portion 1a which has two through-openings 7. A metal bushing 6 is pressed into each of the through-openings 7.

For decoupling the air suction duct 1 from the driver's cab in terms of vibration technology, the air suction duct is fastened by rubber-metal buffers 4 to the driver's cab rear wall 2. The rubber-metal buffers 4 used here consist in each case of two metal discs 4c and a cylindrical rubber part and/or rubber body 4b arranged between the two metal discs 4c. The two metal discs 4c are fixedly connected to the rubber part 4b by means of vulcanization. A threaded hole is provided in the centre of each disc 4c. A threaded shaft 4a extends through these two threaded holes and through a corresponding elongated hole of the rubber part 4b.

The fastening device further comprises for each of the screw connection points a rivet nut which is integrated in the driver's cab rear wall 2, as well as a nut 9 and a washer 8. A fastening device consisting of the aforementioned components 1, 2 and 4 to 9 is known per se from practice.

Figure 4:
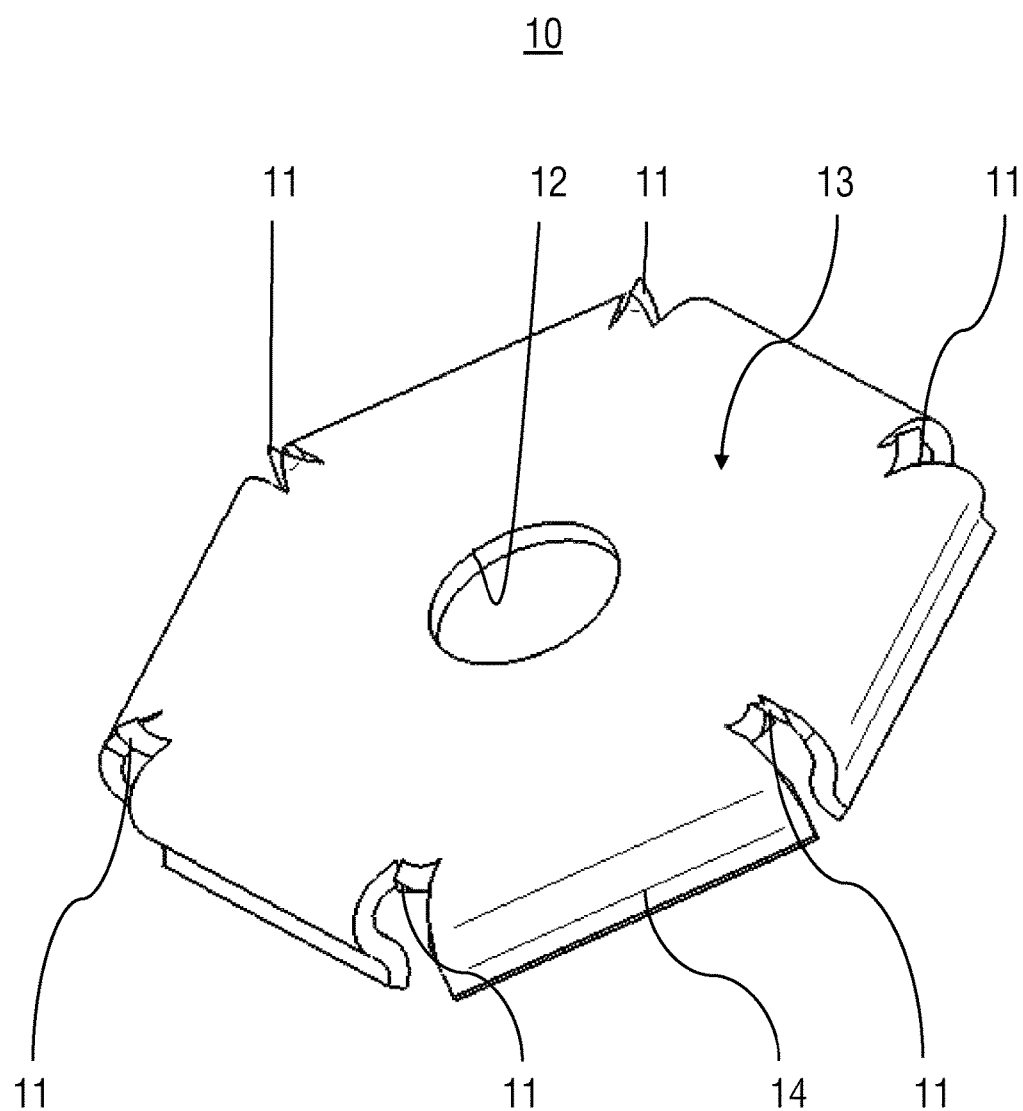
FIG. 4 shows a perspective view of a metal disc with metal tips according to an exemplary embodiment of the present disclosure.

According to the variant of the present disclosure shown in FIG. 3, in addition to these components known per se, the fastening device 15 also comprises a metal disc 10 which is arranged between the rubber-metal buffer 4 and the plastics component 1. The metal disc 10 is shown once again in FIG. 4 in an enlarged view.

The metal disc 10 has a plurality of metal tips 11 which are uniformly distributed on an outer edge of the metal disc 10. The uniform distribution, however, is not necessarily required. In the present case, the metal disc 10 comprises six such angular metal tips 11 of low height, which protrude from a planar bearing surface 13. In the screwed state the planar bearing surface 13 covers a mounting point on the plastics component 1. The metal disc 10 further comprises a central through-opening 12, the threaded shaft 4a being guided therethrough.

If this metal disc 10 is arranged between the rubber-metal buffer 4 and the plastics air suction duct 1, such that the metal tips 11 protrude in the direction of the plastics air suction duct 1, the metal tips during the screwing procedure are forced into the surface of the plastics air suction duct 1 and thereby form a positive anti-rotation stop.

The fastening method for fastening the air suction duct 1 to the driver's cab rear wall 2, therefore, differs from conventional fastening methods, according to this variant, by the additional use of the metal disc 10.

Initially, in a manner known per se the rivet nuts 5 are integrated into the driver's cab rear wall 2. Subsequently, the metal disc 10 is arranged between the rubber-metal buffer 4 and the air suction duct 1 and placed on the corresponding threaded shaft 4a.

Figure 5:
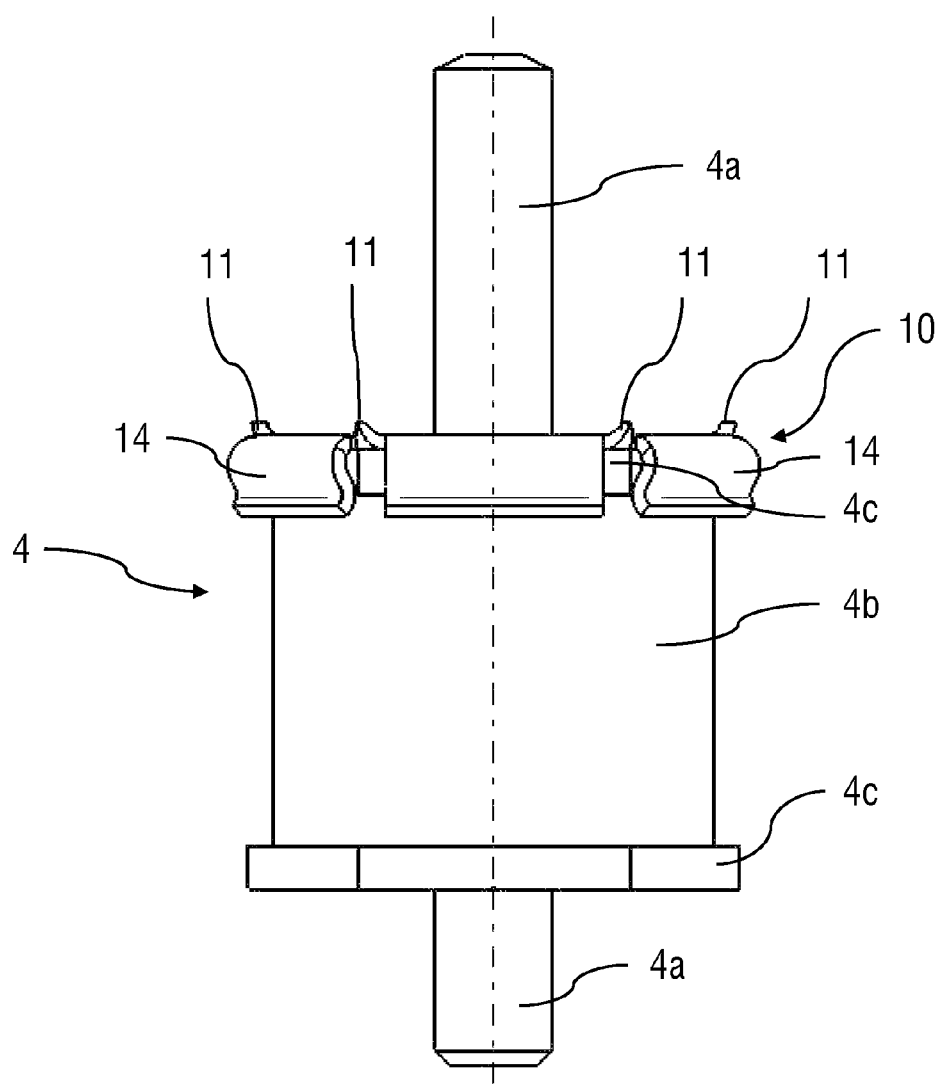
FIG. 5 shows a side view of a rubber-metal buffer with an additional metal disc according to an exemplary embodiment of the present disclosure.

This is shown in FIG. 5. The metal disc 10 bears against one of the metal plates 4c of the rubber-metal buffer 4. In this state, the metal tips 11 of the metal disc 10 protrude upwardly and/or in the direction of the air suction duct 1. Moreover, it may be identified in FIGS. 4 and 5 that on the outer edge of the metal disc 10 in each case a fixing lug 14 is arranged between two protruding metal tips 11, said fixing lug relative to the metal tips 11 extending in the opposing direction from the disc 10, i.e. in the direction of the rubber part 4b. In the state of the air suction duct 1 when it is screwed to the load-bearing component, the fixing lugs 14 bear against a peripheral region of the rubber-metal buffer.

The rubber-metal buffers 4 are then screwed by means of a socket wrench and a defined torque into the rivet nuts 2 integrated on the driver's cab rear wall 2. Subsequently, the air suction duct 1 is suspended on the rubber-metal buffer 4, and aligned and tightened by the same tool or a separate tool by one respective nut 9 and washer. During this tightening procedure, the metal tips 11 press into the surface of the air suction duct 1 and form a positive anti-rotation stop. In this manner, the rubber-metal buffers 4 may be fitted without tension. The risk of reducing the service life of the rubber-metal buffers due to twisting during the screwing procedure is thus avoided. Since during the fastening process the metal tips 11 produce a positive connection with the plastics component 1, the connection between the rubber-metal buffer 4 and the component 1 to be fixed follows directly and not as before via the frictional connection of the rubber-metal buffer 4 to the metal bushing 6 of the plastics component 1.

Figure 6:
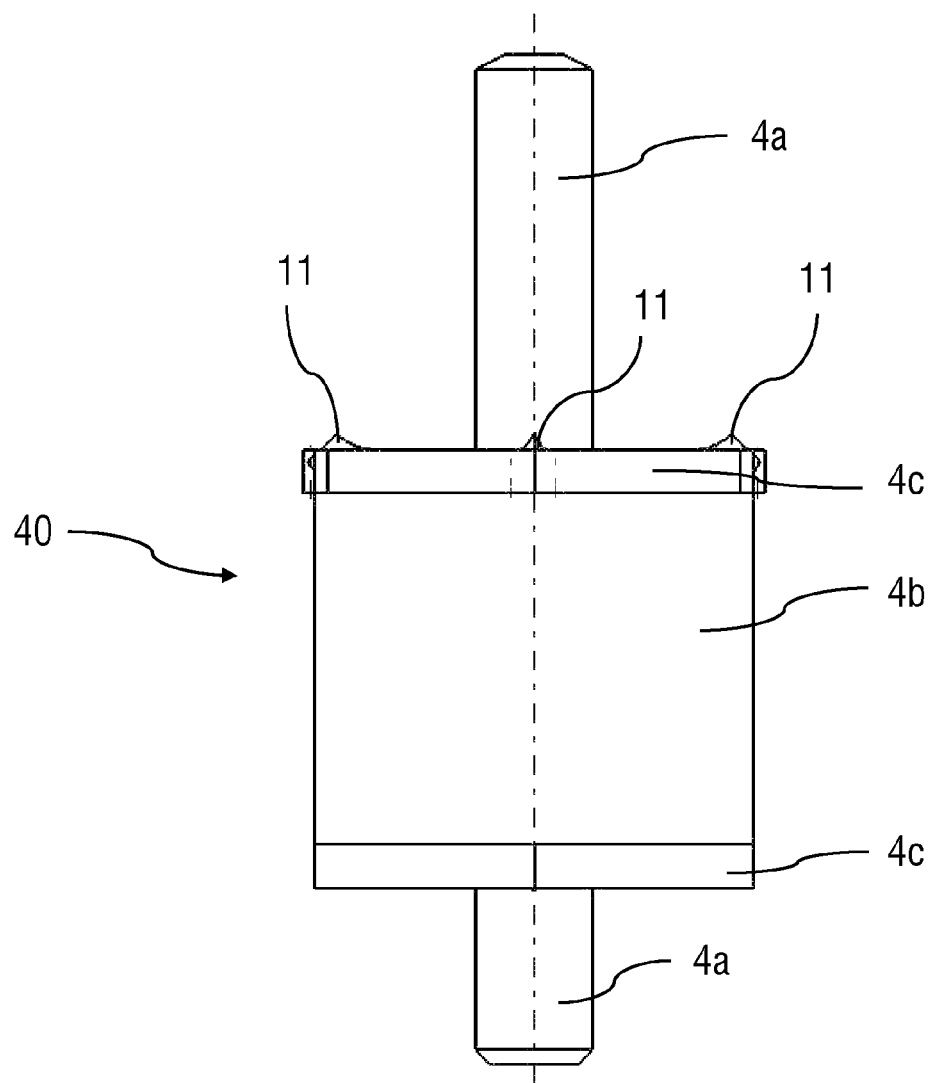
FIG. 6 shows a side view of a rubber-metal buffer according to an exemplary embodiment of the present disclosure.

According to a further variant, however, the metal tips may also be an integral component of the rubber-metal buffer, which is shown in FIG. 6. According to this variant, the rubber-metal buffer 40 differs from a conventional rubber-metal buffer in that one of the metal discs 4c of the rubber-metal buffer has upwardly protruding tips 11 which are uniformly distributed on an outer edge of the metal disc 4c. The uniform distribution, however, is not necessarily required. According to this variant, an additional metal disc 10 may be dispensed with. Moreover, the production sequence remains unaltered in comparison with a conventional method, with the exception that the rubber-metal buffer 40 according to the present disclosure is used.

Although the present disclosure has been described with reference to specific exemplary embodiments, it is obvious to the person skilled in the art that different modifications may be carried out and equivalents used as replacements without departing from the scope of the present disclosure. As a result, the present disclosure is not intended to be limited to the disclsoed exemplary embodiments but is intended to encompass all exemplary embodiments which fall within the scope of the accompanying claims. In particular, the present disclosure also claims protection for the subject and features of the sub-claims independently of the claims referred to.

The invention claimed is:

1. A fastening device for fastening a plastics component to a load-bearing component, comprising
   (a) a rubber-metal buffer arranged as a resilient support between a load-bearing component and a plastics component,
   (b) at least one metal tip, arranged between the rubber-metal buffer and the plastics component, protruding from a first metal disk in the direction of the plastics component, and which engages at least partially in a surface of the plastics component when the plastics component is screwed to the load-bearing component.

2. The fastening device according to claim 1, further comprising a second metal disc wherein the first metal disk, from which the at least one metal tip protrudes, bears against a metal disk of the rubber-metal buffer.

3. The fastening device according to claim 1, where the rubber-metal buffer further comprises two metal disks, at least one of which is the first metal disc from which the at least one metal tip protrudes.

4. The fastening device according to claim 1, wherein the first metal disk, from which the at least one metal tip protrudes is fastened by a material connection to the plastics component.

5. The fastening device according to claim 1 wherein the first metal disk, from which the at least one metal tip protrudes has been at least partially injection-moulded with plastics material during injection-moulding of the plastics component.

6. The fastening device according to claim 1, wherein the at least one metal tip is arranged on an outer region of the first metal disk.

7. The fastening device according to claim 6, wherein the at last one metal tip is arranged on an outer edge of the first metal disk.

8. The fastening device according to claim 1, further comprising a plurality of metal tips arranged on an outer edge of the first metal disk.

9. The fastening device according to claim 8, wherein the plurality of metal tips arranged on an outer edge of the first metal disk are uniformly distributed.

10. The fastening device according to claim 1, wherein the first metal disk, from which the at least one metal tip protrudes, comprises at least one fixing lug which protrudes on an outer edge of the first metal disk in the direction of the rubber-metal buffer.

11. The fastening device according to claim 1, wherein the first metal disk, from which the at least one metal tip protrudes, comprises at least one tensioning element which protrudes on an outer edge of the first metal disk in the direction of the rubber-metal buffer.

12. The fastening device according to claim 1, wherein the first metal disk, from which the at least one metal tip protrudes, comprises a central opening, a threaded shaft of the screw connection being guided there through in order to screw the plastics component to the load-bearing component.

13. The fastening device according to claim 1, wherein a metal bushing is pressed into the plastics component, a threaded shaft of the screw connection being guided there through in order to screw the plastics component to the load-bearing component.

14. The fastening device according to claim 1, wherein
   (a) the plastics component is a primary air channel or suction duct; and
   (b) the load-bearing component is a driver's cab rear wall of a vehicle.

15. A motor vehicle including a fastening device for fastening a plastics component to a load-bearing component, the fastening device comprising:
   (a) a rubber-metal buffer arranged as a resilient support between a load-bearing component and a plastics component,
   (b) at least one metal tip, arranged between the rubber-metal buffer and the plastics component, protruding from a first metal disk in the direction of the plastics component, and which engages at least partially in a surface of the plastics component when the plastics component is screwed to the load-bearing component.

* * * * *